United States Patent [19]

Stcherbatcheff et al.

[11] 4,015,870
[45] Apr. 5, 1977

[54] FRONT PROTECTION DEVICE FOR MOTOR VEHICLES

[75] Inventors: Georges Stcherbatcheff; André Lefeuvre, both of Boulogne-Billancourt, France

[73] Assignees: Regie Nationale des Usines Renault; Automobiles Peugeot, both of Paris, France

[22] Filed: May 28, 1975

[21] Appl. No.: 581,579

[30] Foreign Application Priority Data

May 30, 1974 France .............................. 74.18751

[52] U.S. Cl. .................................................. 293/32
[51] Int. Cl.² ........................................ B60R 21/14
[58] Field of Search .............. 293/9, 15, 16, 24–26, 293/42–45, 38–41, 47, 77, 74, 31, 34, 37

[56] References Cited

UNITED STATES PATENTS

| | | | |
|---|---|---|---|
| 585,729 | 7/1897 | Weikly | 293/42 |
| 602,226 | 4/1898 | McKaig | 293/42 |
| 813,498 | 2/1906 | John | 293/42 |
| 960,976 | 6/1910 | Littman et al. | 293/42 |
| 1,285,128 | 11/1918 | Goodman | 293/39 |
| 1,342,402 | 6/1920 | McDonald | 293/42 |
| 3,236,552 | 2/1966 | Percifull | 293/9 |
| 3,829,140 | 8/1974 | Jehu et al. | 293/38 X |

FOREIGN PATENTS OR APPLICATIONS 16,547  7/1910  United Kingdom ................ 293/24

Primary Examiner—Stanley H. Tollberg
Assistant Examiner—Norman L. Stack, Jr.
Attorney, Agent, or Firm—Fleit & Jacobson

[57] ABSTRACT

This invention relates to a pedestrian protection device for motor vehicles which comprises essentially a hinged member adapted to be raised to an operative position from a normally lower inoperative position on the motor vehicle.

More particularly, this hinged member constitutes a kind of transverse beam or barrier having side flanges provided with two series of connecting means associated with a pair of trunnions permitting the rotation of said beam and secured to said side flanges. The second series of connecting means provides an operative connection between the beam and the thrust rod of a cylinder and piston unit having its cylinder pivoted to the vehicle body. The essential purpose of this device is to protect pedestrians against the dangers of running into a car.

7 Claims, 10 Drawing Figures

FRONT PROTECTION DEVICE FOR MOTOR VEHICLES

The present invention relates in general to a front protection device for motor vehicles, which extends transversely to the front end of the vehicle body is adapted automatically to change the impact area between the vehicle and an obstacle.

More particularly, this invention provides a device comprising a kind of hinged barrier adapted to increase the height of the front portion of the vehicle, notably in order more efficiently to protect pedestrians likely to be hit by the vehicle thus equipped.

The study of the paths followed by anthropomorphic dummies when hit by a motor vehicle and the measurements of the accelerations thus produced at various parts of the dummy body proved that above a speed of about 32 km.p.h· (20 m.p.h.) the shock applied by the vehicle to the pedestrian is two to three times more serious than the impact between the pedestrian and the ground.

Inquiries were made in order to ascertain the impact points of the pedestrian on vehicles involved in road accidents and from the data thus obtained it was possible to reconstitute the possible paths followed during an accident by an adult pedestrian and by a child. Thus, an adult pedestrian hit by the front of a vehicle usually strikes with his head the bonnet, the windshield or the frame thereof, whereafter he falls back on the ground.

In contrast therto, a child hit by a motor vehicle is hurled directly to the ground, ahead of the vehicle.

Therefore, it is particularly advantageous to modify the front end of the vehicle body in order to change the paths followed by the various portions of the body of a pedestrian hit by the vehicle, while eliminating any contact between the pedestrian and the dangerous parts of the vehicle, such as windshield frame and glass, applying the brakes and prevent the sudden hurling of the pedestrian to the ground.

A known prior art safety device comprises a barrier-forming hood belt adapted to retain a pedestrian hit by the vehicle and hitting himself the top surface of the hood, for the purpose of preventing the pedestrian from hurled to the ground. Now since this device has no influence whatsoever on the localization of the impact between the vehicle and the pedestrian, the path followed by the latter in case of accident is not changed.

A vehicle is also known of which the front portion carries a hinged trap or flap adapted to assume an active raised position facilitating the ejection of a shock-absorbing inflatable bag. Now this device damps out the impact forces when a pedestrian is hit by the vehicle without changing the pedestrian's path.

It is the essential object of the present invention to provide a front protection device adapted to raise the upper end of the front hood of a motor vehicle when the driver applies the brakes preliminary to hitting an obstacle.

It is another object of this invention to provide a front protection device adapted to change the path followed by an adult pedestrian hit by the vehicle, in order to:

localize the impacts of the pedestrian's head on the hood of the vehicle while protecting the pedestrian notably against shocks with the windshield and the frame thereof;

retain the pedestrian on the hood in order to prevent him from falling back on the ground.

It is another object of this invention to provide a front protection device capable of limiting the seriousness of wounds to the head and neck of a child pedestrian hit by the vehicle.

According to this invention, the front protection device constituting the subject-matter thereof comprises essentially a beam having rounded edges and lateral end flanges supporting a first series of means for connecting the beam to the chassis of the vehicle, said means being rigid with a first pivot trunnion for rotating said beam, and a second series of means for connecting the beam to the thrust rod of a control cylinder and piston unit pivoted to the chassis of the vehicle and connected to another pivot trunnion for rotating said beam.

The beam thus arranged may be caused to rotate by mechanical drive means or servo-control means which are no part of the present invention.

Other features and advantages of the front protection device according to this invention will appear as the following description proceeds with reference to the attached drawings illustrating diagrammatically by way of example typical forms of embodiment of the invention. In the drawings.

Figure 1:
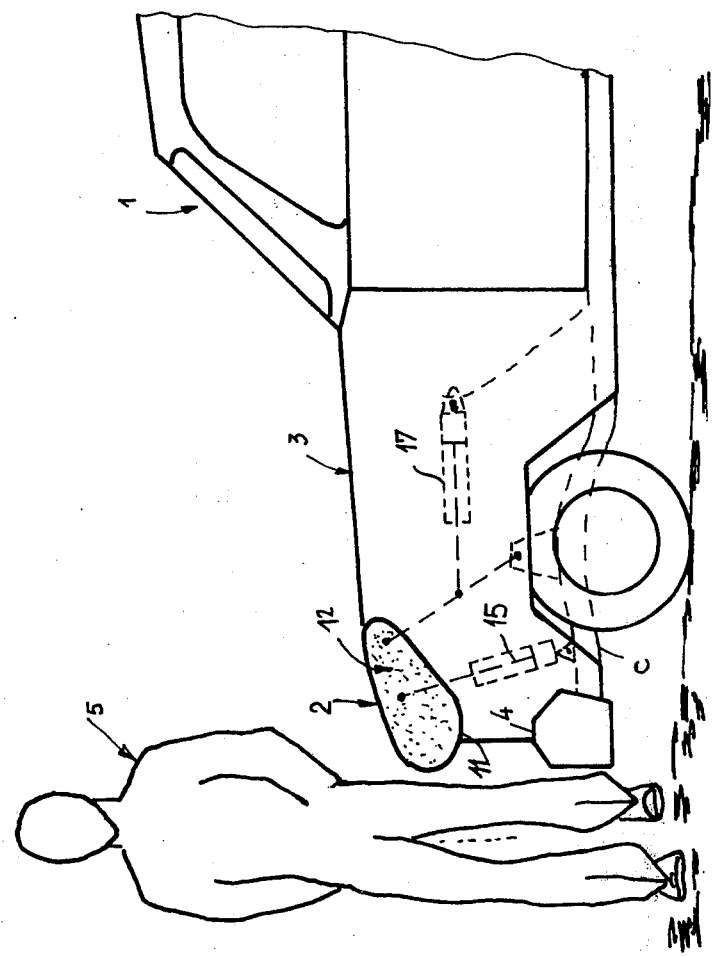
FIG. 1 illustrates diagrammatically the front portion of a motor vehicle equipped with the front protection device of this invention, this device being shown in its passive position just before hitting a pedestrian.
Figure 2:
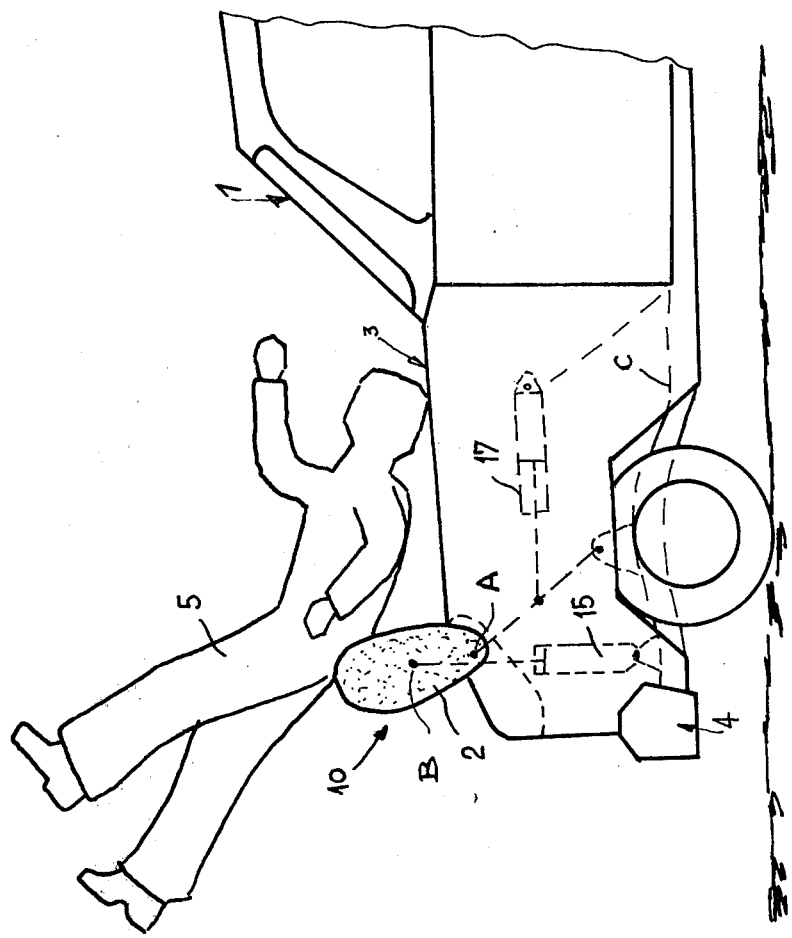
FIG. 2 illustrates the front portion of the vehicle of FIG. 1 but with the device in its operative position after hitting a pedestrian.

Referring to FIGS. 1 and 2, it will be seen that a passenger motor vehicle 1 is provided with a front protection device 2 according to the instant invention. This device 2 extends across the front end of the engine or front hood 3 of the vehicle, the body of which further comprising a chassis C and a bumper 4.

When hitting a pedestrian 5 (or just before the shock), the device 2 is in the operative position illustrated in FIG. 2.

According to this invention, the device 2 comprises essentially a hinged barrier or like member adapted to be turned upwards and shaped to constitute an integral part of the vehicle body. This barrier consists essentially of a beam 10 having rounded edges 11 and two lateral side flanges 12.

Figure 3:
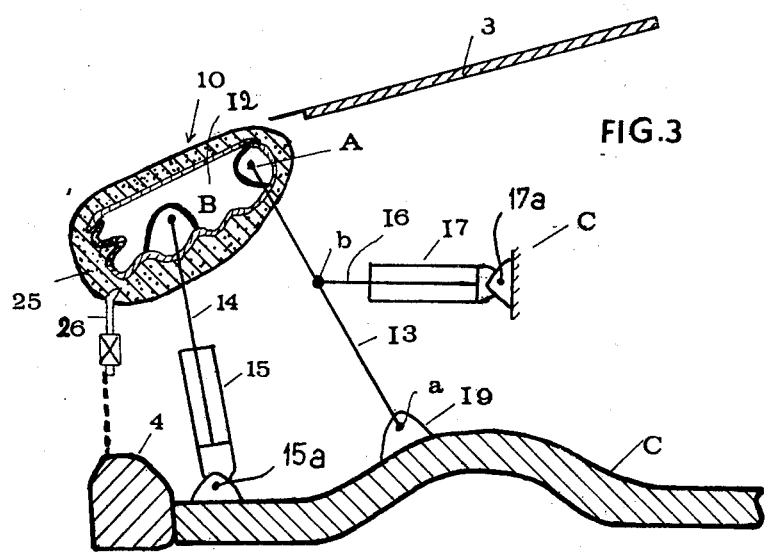
FIGS. 3 and 4 are more detailed views showing the device in its inoperative and operative positions, respectively.
Figure 4:
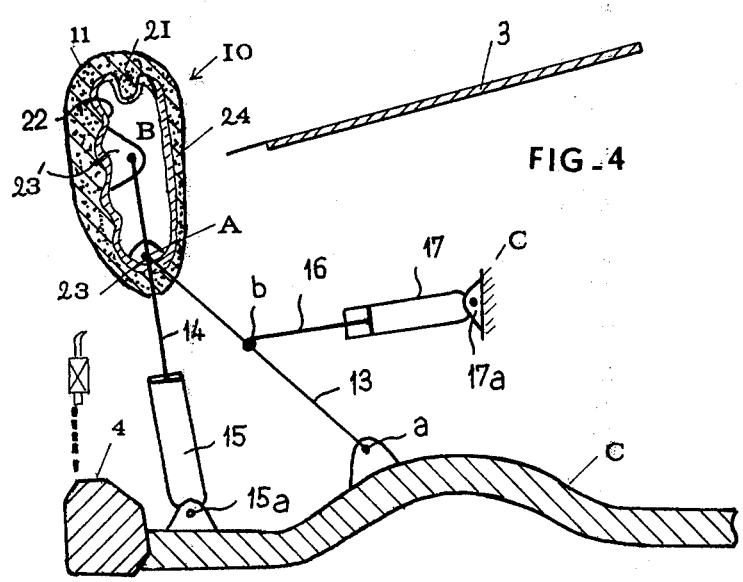

Each flange 12 carries a first series of connecting means. These connecting means comprise, as shown in FIG. 3, at least one rod 13 having one end pivotally connected to a first pivot trunnion A carried by each flange 12 in the vicinity of the rear end of beam 10. The free end of rod 13 is pivotally mounted to a shaft a rigid with an anchoring clevis 19 welded or otherwise rigidly secured to the chassis C of the vehicle.

Another pivot trunnion B also carried by each flange 12 pass substantially through the centre of gravity of the beam in order to reduce the vis inertia of said beam during its movement of rotation about said second pivot trunnion B.

A second series of connecting means are associated with the thrust rod 14 of a cylinder and piston unit 15 having its cylinder pivotally mounted at 15a to the chassis C.

The first rod 13 also carries the pivot pin b of the thrust rod 16 of another or auxiliary cylinder and piston unit 17 having its cylinder also pivoted at 17a to the chassis C.

Figure 5:
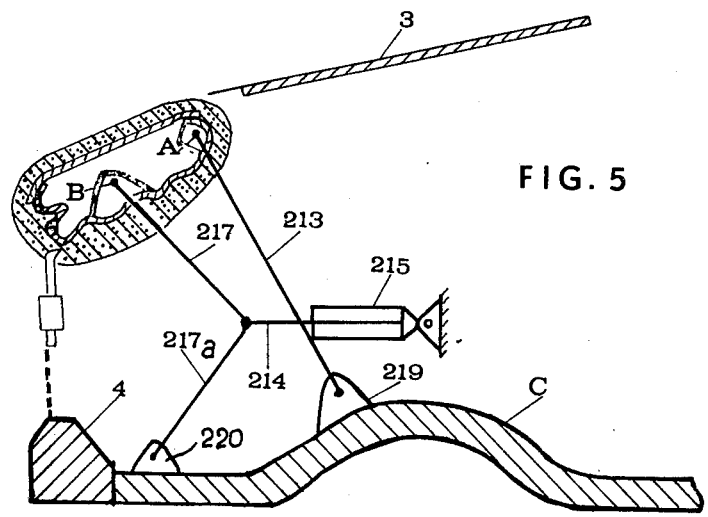
FIGS. 5 and 6 are similar view showing two modified forms of embodiment of the device, and FIGS. 7 to 10 inclusive illustrate the paths followed by the various parts of a pedestrian's body hit by a vehicle equipped with the protection device of this invention.

In the modified form of embodiment illustrated in FIG. 5, the thrust rod 214 of control unit 215 is connected to the common pivot pin of a pair of arms 217, 217a forming a compass, the other ends of these arms 217, 217a being pivoted the one to the second pivot trunnion B and the other to a pivot pin 220 carried by the chassis C, respectively, This Figure also shows the anchoring 219 of rod 213 to which correspond the homologue members 13, 19 of FIG. 3.

Figure 6:
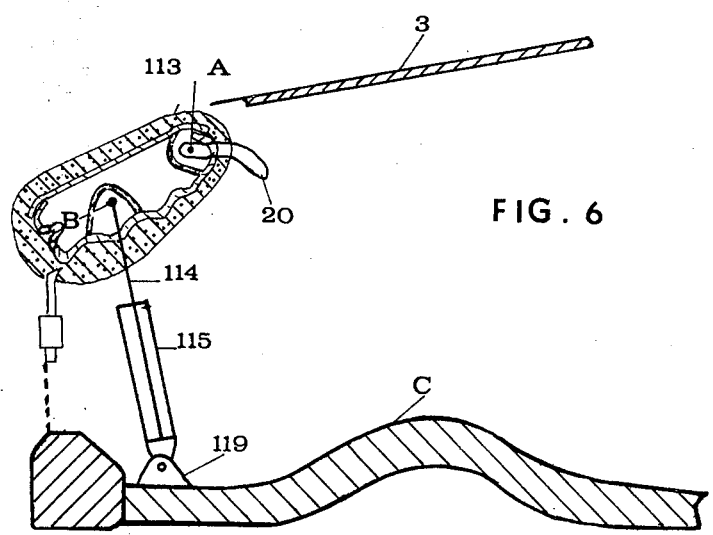
Figure 7:
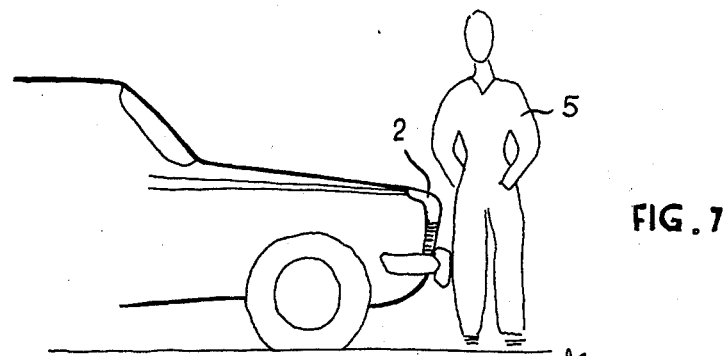
Figure 8:
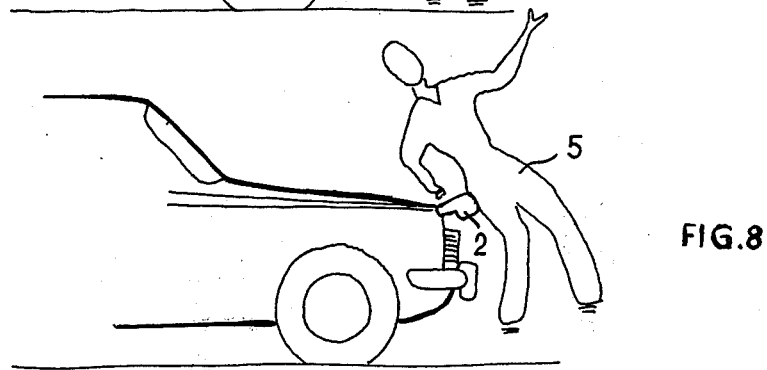
Figure 9:
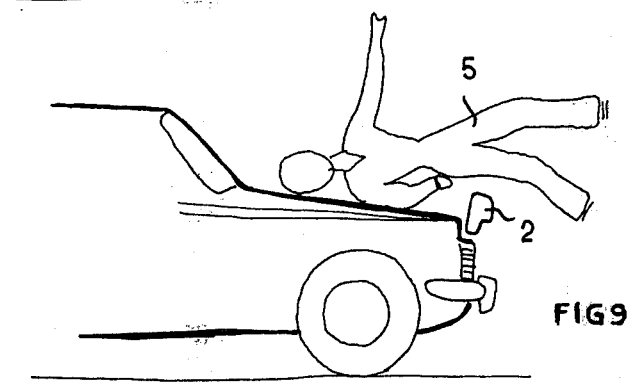
Figure 10:
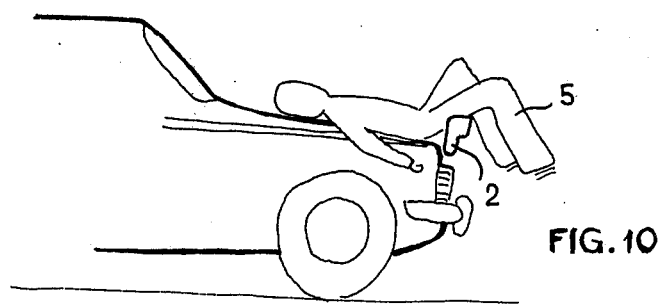

In another modified form of embodiment illustrated in FIG. 6, the first pivot pin A is merged into its means connecting same to the chassis C. To this end, the pivot trunnion 113 engages a curved slot 20 formed in a plate rigid with the side elements of the vehicles, the movement of the pivot trunnion B being obtained through the actuation of the piston rod 114 of the cylinder and piston unit 115 pivoted to an anchoring clevis 119 rigid with the chassis C.

In the various forms of embodiment of the device illustrated herein the beam 10 comprises a structure capable of damping the forces produced by impacts exerted thereon. For this purpose the beam comprises a sheet-metal trough 21 having a corrugated or pleated bottom 22 and an inner surface provided with support means 23, 23' for the pivot trunnions A and B. The trough 21 is closed by a cover 24 of which one portion constitutes an extension of the vehicle hood 3. One portion of the beam 10 corresponding to said trough 21 is lined with damping cellular material 25 such as plastic foam or like expanded material.

According to another feature characterising this device the beam carries a keeper for a remote-controlled safety latch 26 adapted to be mounted to the front grille of the vehicle, on a chassis member or on a component of the vehicle body.

The above-described device operates as follows:

When the crash detector (not shown) disposed at the front of the vehicle detects the oncoming obstacle, it delivers a signal controlling the opening of latch 26 and possibly a control signal for actuating the various actuators or units. These may consist of spring-loaded devices, pyrotechnical or blast-powder units, pneumatic units, etc . . . , and in the case of fluid-operated units these are operated from a common source of fluid under pressure. The thrust exerted by rods 14 or 114 of units 15 or 115, respectively causes the pivot trunnion B to be raised so that the beam 10 pivots in the clockwise direction about the pivot trunnion A, as seen in the drawings. Referring more particularly to FIG. 6, it is clear that during the movement of pivot trunnion B, the other trunnion A moves in the curved slot 20 due to the vis inertia resulting from the mass of the pedestrian hit by the front of the vehicle.

When the rod of unit 15 or 115 has completed its stroke, the beam 10 is stopped in a stable position from which it is not possible to restore the beam in its inoperative position under the thrust exerted by the pedestrian's weight.

For this purpose, the anchoring means 19, 119 or 219 and the two pivot trunnions A, B of beam 2 constitute together a triangular structure of which the side connecting the second pivot trunnion B to the corresponding anchoring means 19, 119 or 219 is deformable. The apex A opposite said side assumes in succession a stable position on one or the other side thereof, according as the beam 2 is in its retracted inoperative position or in its raised operative position. In this last instance or position, at least, the rod of control unit 15, 115 or 215 has completed its stroke so that the beam movement is limited automatically.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. A pedestrian protection device extending across the front end of the body of a motor vehicle having a chassis comprising, in combination, a transversely extending beam disposed on the front end of the vehicle adjacent the vehicle upper surface for movement between an inoperative retracted position and an operative raised position, said beam having a curvilinear cross-sectional shape and a pair of side flanges, a first pivot trunnion associated with said side flanges and defining a transversely extending axis of rotation, first connecting means pivotably connected at one end to said first pivot trunnion and pivotally connected at its other end to the vehicle chassis to permit movement of said first transversely extending axis of rotation during the movement of said beam between said inoperative and operative positions, a second pivot trunnion associated with said side flanges and, defining a second transversely extending axis of rotation for said beam and second connecting means including a fluid pressure actuated cylinder pivotally connected to the vehicle chassis and having a piston operatively connected to said second pivot trunnion for pivotally moving said beam about said second axis of rotation between an inoperative retracted position and an operative raised position to increase the height of the front portion of the vehicle.

2. A device according to claim 1 wherein first pivot trunnion is disposed adjacent the rear portion of said beam and wherein said first connecting means comprises at least one rod having one end pivotally connected to said first pivot trunnion and wherein said second connecting means includes a pair of compass-forming arms connected together at their inner ends by a pivot pin, the outer ends of said arms being pivotally connected to the vehicle chassis and said second pivot trunnion respectively, said piston being connected to said pivot pin and wherein said second pivot trunnion in substantially coincident with the center of gravity of said beam.

3. A device acccording to claim 1 wherein said first connecting means comprises a rod having ends pivotally connected to the vehicle chassis and to said first pivot trunnion respectively, a pivot pin on said rod intermediate its ends and including an auxiliary fluid pressure actuated cylinder pivotally connected to the vehicle chassis and having a piston connected to said pivot pin.

4. A device according to claim 1 wherein said first connecting means and said first and second trunnions together form a triangle, the side of said triangle between said second trunnion and the connecting point of said first connecting means with the vehicle chassis being deformable, the apex defined by said first trunnion assuming in succcession a stable position on one or the other side of said deformable side in the inoperative and operative position of said beam respectively, said piston being arranged to complete its stroke at least in said operative position.

5. A device according to claim 1 wherein the vehicle chassis is provided with an elongated arcuate guide slot and wherein said first pivot trunnion of said beam is operatively associated with said guide slot.

6. Device according to claim 1, wherein said beam comprises a shock-absorbing structure and is partly lined with a damping cellular material.

7. A device according to claim 6 including keeper means on said beam and a remote controlled latch rotatably mounted on the vehicle in operative association with said keeper means.

* * * * *